United States Patent
Sri-Jayantha et al.

(10) Patent No.: US 7,904,185 B2
(45) Date of Patent: Mar. 8, 2011

(54) SYSTEM AND METHOD FOR SENSOR REPLICATION FOR ENSEMBLE AVERAGING IN MICRO-ELECTROMECHANICAL SYSTEM (MEMS)

(75) Inventors: Sri M. Sri-Jayantha, Ossining, NY (US); Arun Sharma, New Rochelle, NY (US); Hien Dang, Nanuet, NY (US); Evangelos S. Eleftheriou, Zurich (CH); Mark A. Lantz, Zurich (CH); Charalampos Pozidis, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 12/165,134

(22) Filed: Jun. 30, 2008

(65) Prior Publication Data
US 2008/0270061 A1 Oct. 30, 2008

Related U.S. Application Data (63) Continuation of application No. 10/968,181, filed on Oct. 20, 2004, now Pat. No. 7,426,416.

(51) Int. Cl.
*G05B 13/02* (2006.01)
(52) U.S. Cl. .............................. 700/32; 700/40
(58) Field of Classification Search .................. 700/32, 700/40, 42
See application file for complete search history.

(56) References Cited

U.S. PATENT DOCUMENTS

| | | | |
|---|---|---|---|
| 4,270,223 A | 5/1981 | Marston | |
| 5,163,328 A | 11/1992 | Holland et al. | |
| 5,859,874 A | 1/1999 | Wiedeman et al. | |
| 5,875,109 A | 2/1999 | Federspiel | |
| 6,844,214 B1 * | 1/2005 | Mei et al. ................... | 438/52 |
| 7,003,402 B2 * | 2/2006 | Christie et al. ............. | 702/14 |
| 7,194,293 B2 | 3/2007 | Baker, Jr. | |
| 7,286,874 B1 | 10/2007 | Bornzin | |
| 2003/0050735 A1 | 3/2003 | Griffis | |
| 2004/0215396 A1 * | 10/2004 | Christie et al. ............. | 702/14 |

OTHER PUBLICATIONS

"Self Organization in Sensor Networks", -Collier et al, UCLA Department of Organismic Biology, Ecology, and Evolution, Dec. 10, 2003.*
"High Spatial Resolution MEMs surface pressure sensor array for transonic compressor IGV Measurement", Leger et al, Wright State University, IEEE 2001.*
"Biosignal and Biomedical Image Processing", Semmlow. Chapter 2, pp. 34 and 35. CRC Press—Jan. 14, 2004.*
J. Bendat, et al., "Random Data Analysis and Measurement Procedures", A Wiley-Interscience Publication, 1986, pp. 10-11.
Semmlow, John L. "Biosignal and Biomedical Image Processing-Matlab-based Applications" -pp. 34-35, CRC Press- Jan. 14, 2004.
Jayasimha, D.N., "Fault Tolerance in Multisensor Networks"-IEEE Transactions on Reliability, vol. 45, No. 2, Jun. 1996.
Chen, Jinghong and Kang, Sung-Mo-"Model-Order Reduction of Non-linear MEMS Devices Through Arclength-based Karhunen-Loeve Decompositions" -IEEE 2001.

* cited by examiner

*Primary Examiner* — Michael D Masinick
(74) *Attorney, Agent, or Firm* — McGinn Intellectual Property Law Group, PLLC (57) ABSTRACT

A MEMs-based system (and method), includes a sensor array including at least two sensors providing a basis for ensemble averaging.

33 Claims, 12 Drawing Sheets

SYSTEM AND METHOD FOR SENSOR REPLICATION FOR ENSEMBLE AVERAGING IN MICRO-ELECTROMECHANICAL SYSTEM (MEMS)

RELATED APPLICATIONS

This Application is a Continuation Application of U.S. patent application Ser. No. 10/968,181, filed on Oct. 20, 2004 now U.S. Pat. No. 7,426,416.

BACKGROUND OF THE INVENTION

1. Field of the Invention

The present invention generally relates to a method and apparatus for sensor replication, and more particularly to a method and apparatus for sensor replication for ensemble averaging in micro-electromechanical systems (MEMS).

2. Description of the Related Art

A MEMS-based servo positioning device, when enclosed within a disturbance free housing, is capable of producing high precision mechanical displacement. Noise inherent in a position sensor that is embedded in a MEMS-based servo control system determines the precision of the integrated system.

To improve the precision, noise generated in a position sensor [1-sigma ($\sigma$)] must be reduced. However, there is a fundamental limit to minimizing the sensor noise, and creative methods are required to circumvent the performance limitation.

More generally, a sensing process requires a transducer and a signal conditioning method. A transduction process not only generates a useful signal, but inevitably produces a noise component, thus reducing the accuracy of the sensing process. Using instrumentation-quality electronics, the total noise from a sensor can be kept to a minimum, but the noise due to the transduction process cannot be eliminated completely. Position sensing of an object can be derived from a multitude of transduction processes. Among non-contact transduction processes where frictionless movement is desired, optical, thermal and/or magnetic coupling effects can be employed.

Figure 1:
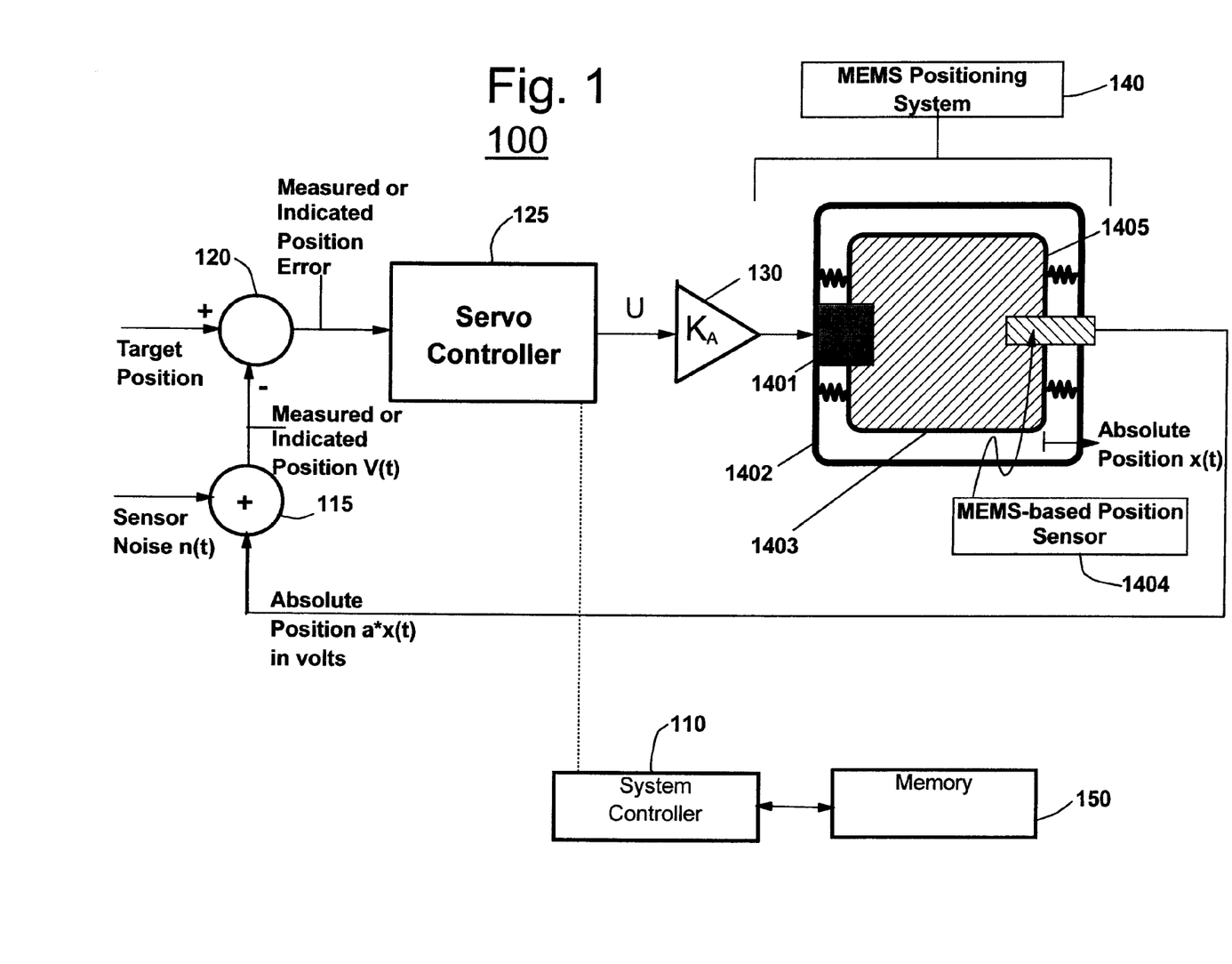
FIG. 1 illustrates schematically a MEMS servo control system 100 with a single position sensor.

FIG. 1 shows some exemplary elements of a single-axis position servo control system 100 including a MEMs positioning system 140. A position sensor 1404 of the system 140 illustrated in this example is sensitive to a location of an edge 1405 of a movable device 1403 designed to move with respect to a stationary frame 1402.

The sensor voltage V(t) includes a noise component n(t). A servo controller 125 produces a control signal U from the indicated position error signal (e.g., provided from an adder or summer unit (e.g., summing junction) 120, and drives a power signal (e.g., typically an electric current), via a driver 130, into an actuator 1401.

It is noted that an absolute position is provided from the MEMs-based position sensor 1404 back to an adder 115, which also receives sensor noise n(t), thereby to output a measured or indicated position V(t). The measured or indicated position V(t) combined with a target position signal, results in the measured or indicated position error signal output by the adder 120 to the servo controller 125, as described above.

The servo controller 125 and associated electronics (e.g., for measuring the position, generating control signal U, etc.) are a subset of a system controller 110. The system controller has a memory 150 (e.g., a memory bank) in which servo system parameters are stored during the power-on operation of the servo control system 125.

Figure 2:
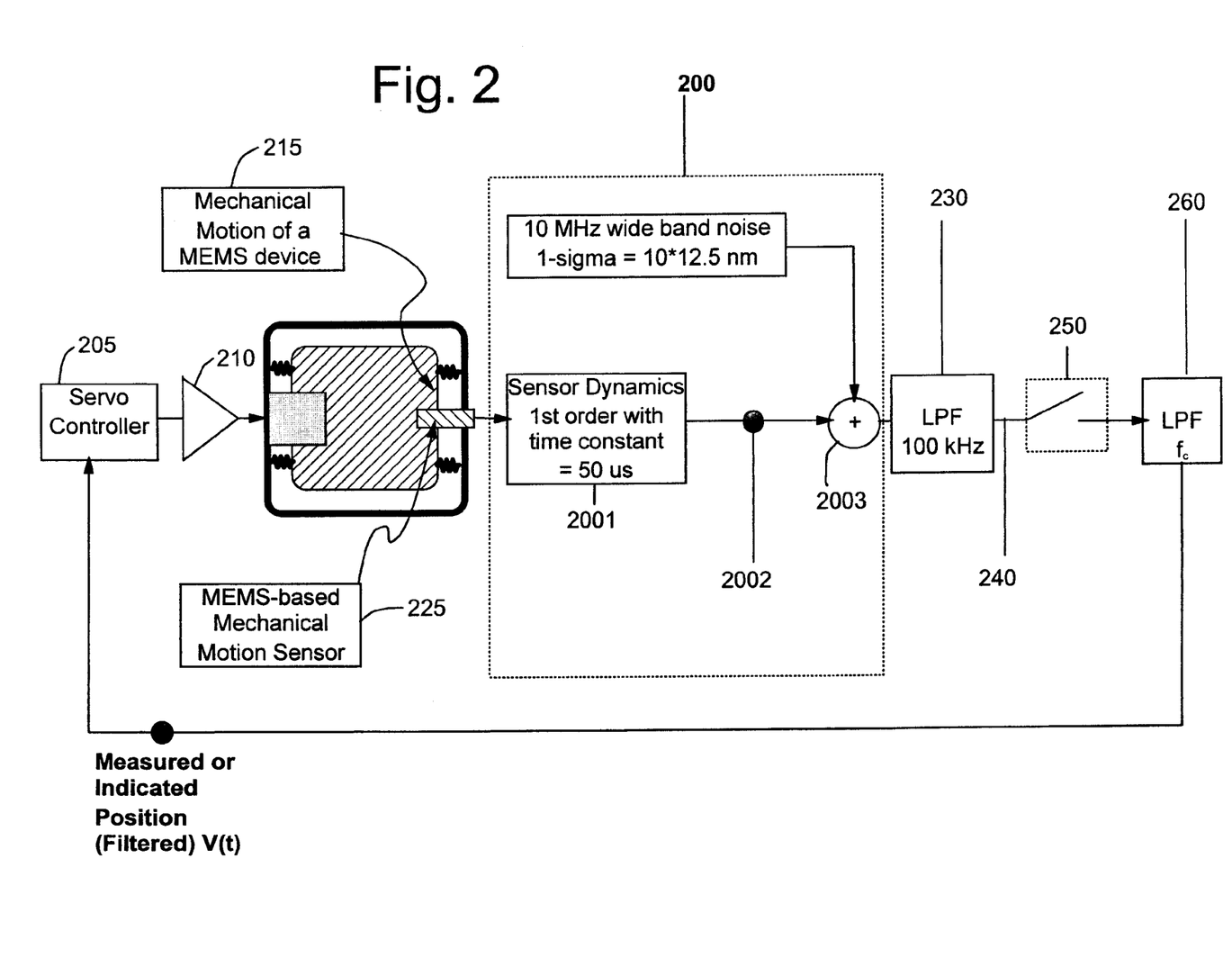
FIG. 2 illustrates a sensor noise model 200 used in the analysis.

FIG. 2 elaborates the parameters of a position sensor employed to establish the advantages and merit of the present invention. As shown in FIG. 2, a single sensor noise model 200 is shown receiving an input from a MEMs-based mechanical position sensor 225 based on the mechanical motion 215 of a MEMs device. A noiseless (ideal) sensor output 2002 is shown being input to an adder 2003, which also receives a 10 MHz wide band noise (1-sigma=10*12.5 nm).

The adder 2003 provides an output to a lowpass filter 230 (e.g., having a cutoff of 100 kHz), which in turn provides an analog output 240 of a single MEMs position sensor 240 to a sampler 250. The sampler 250 provides an output to a low pass filter (LPF) 260 which is a second order digital filter.

The LPF 260 provides a measured or indicated position (filtered) V(t) to a servo controller 205. The servo controller outputs a signal to an amplifier 210 to control the mechanical motion of the MEMs device.

It is noted that exemplarily the transducer is based on a thermal coupling effect which is not the subject of the present invention. The sensor dynamics 2001 are dominated by the thermal coupling effect which has a time constant of 50 µs, and is characterized by a first order system.

The noise power spectrum measured after the 100 kHz second order analog low-pass filter 230 contained a noise equivalent to 12.5 nm (1-sigma). The targeted displacement range of the position sensor is 100 µm. In order to demonstrate the invention through simulation and as mentioned above, the sensor noise at the source is represented by a wide-band (10 MHz) noise (10*12.5 nm 1-sigma).

In order to capture the effect of sensor noise in this application under realistic operating conditions, a servo control system is required. An industry-proven proportional-integral-derivative (PID) positioning servo system (e.g., servo controller 205) is employed for the MEMS-based positioning device. A characteristic PID controller transfer function, for example, in analog form, is represented by the following expression:

$$\text{Controller(Output/Input)} = (k_P + k_D s + k_I/s)$$

where gains $k_P$, $k_D$, and $k_I$ are proportional, derivative and integral gains, and 's' is the Laplace transform operator. The parameterization process to compute the gains is well-known in the field. A control system designer would use a dynamic model of the scanner and would derive the gain values to achieve an optimum servo controller design.

It is noted that if a MEMs-based sensor has too much noise, one could use a low pass filter (as described above), but such a low pass filter introduces a phase lag.

Figure 3A:
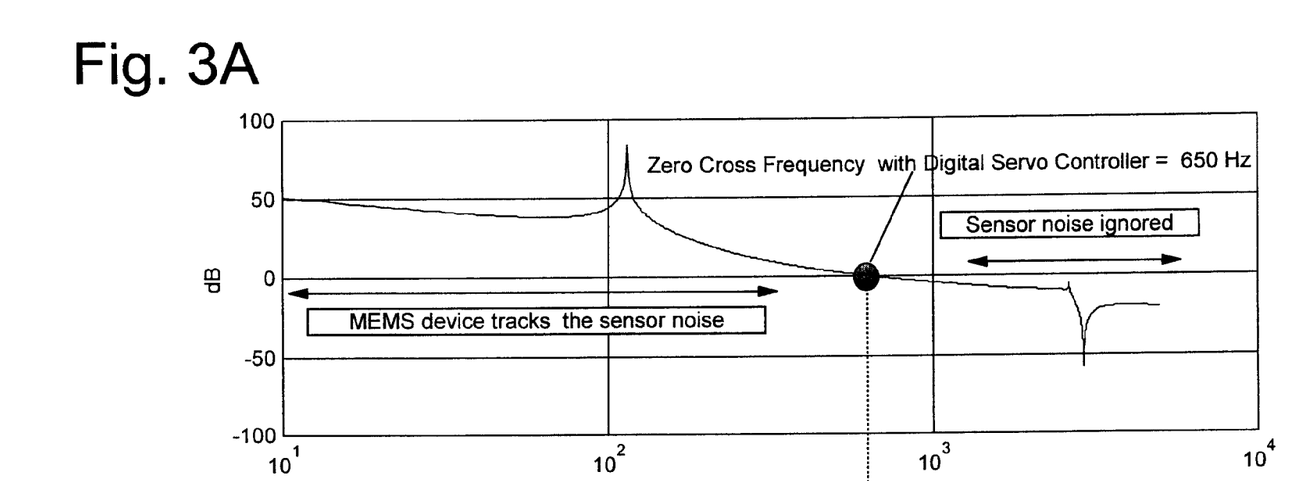
FIGS. 3A-3B illustrate a typical open loop transfer function of the position control servo system.
Figure 3B:
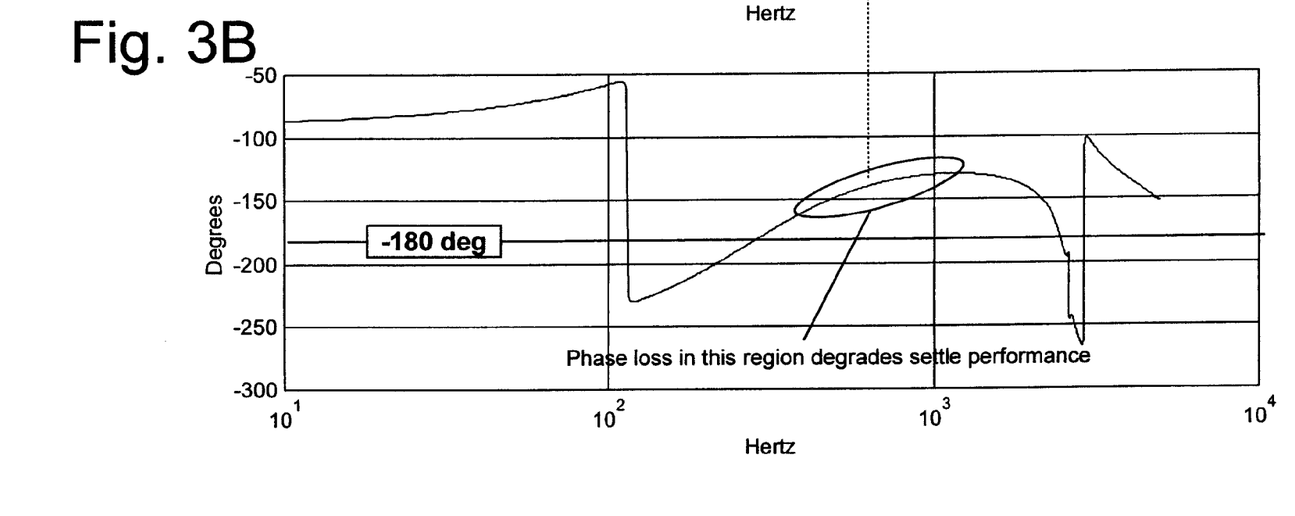

FIGS. 3A-3B show the open loop transfer function of a characteristic MEMS-based position control system with a digital-PID controller. A crossover frequency of 650 Hz is used in this study, as shown in FIG. 3A. The controller is cascaded with a digital low pass filter (LPF) with a 4 kHz crossover frequency. FIG. 3B shows that the phase loss in this region degrades the settling performance.

Figure 4:
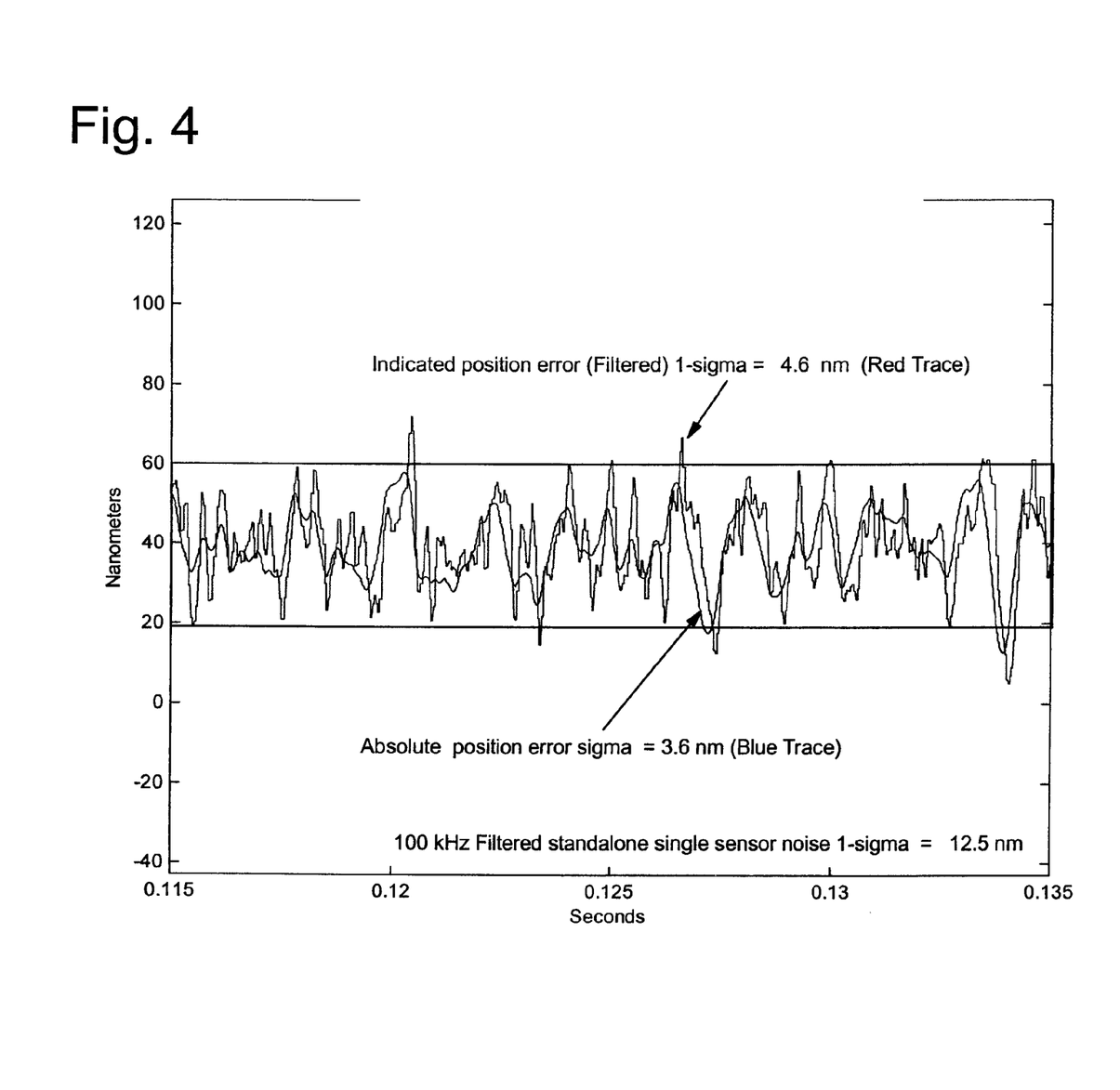
FIG. 4 illustrates a servo position control performance with a single sensor.

FIG. 4 shows the position sensor output obtained after the 4 kHz LPF and estimated (through simulation) position of the MEMS device. It is noted that the stand alone (i.e., without any servo action) sensor noise component has 1-sigma of 12.5 nm.

However, after 4 kHz LPF and under closed loop servo conditions, the sensor output is reduced to 1-sigma of 4.6 nm (e.g., this component is referred to as indicated or measured sensor output) because the MEMS system actually follows the sensor noise (an undesirable but necessary effect of the servo) at lower than crossover frequencies.

The low frequency noise following capability of a servo actually produces physical motion (e.g., referred to as absolute position) and the corresponding motion is detrimental to the precision centric performance of a system. The estimated value of the absolute position is 3.6 nm even though the noisy sensor output indicates 4.6 nm. It is noted that, if an ideal sensor (i.e., zero noise component) was employed to monitor the motion of the mechanical device, then it would measure 3.6 nm.

The position accuracy of the servo control system can be improved by reducing the corner frequency "fc" of the low-pass filter shown in FIG. 2. However, reducing the LPF corner frequency introduces additional phase lag and penalizes the dynamic performance, such as settling time, unfavorably.

Thus, prior to the present invention, there has been no method or system which shows how this limitation can be circumvented.

SUMMARY OF THE INVENTION

In view of the foregoing and other exemplary problems, drawbacks, and disadvantages of the conventional methods and structures, an exemplary feature of the present invention is to provide a method and structure in which sensor noise is reduced without introducing additional phase lag and without penalizing the dynamic performance.

Another exemplary feature is to provide a system and method in which sensor replication for ensemble averaging is performed.

In a first aspect of the present invention, a MEMs-based system, includes a sensor array including at least two sensors providing a basis for ensemble averaging.

In a second aspect of the present invention, a method of reducing noise in a MEMs-based system, includes providing a sensor array including at least two sensors, and ensemble averaging outputs of the sensor array.

In a third aspect of the present invention, a signal-bearing medium tangibly embodying a program of machine-readable instructions executable by a digital processing apparatus to perform a method of reducing noise in a MEMs-based system, includes providing a sensor array including at least two sensors, and ensemble averaging outputs of the sensor array.

In a fourth aspect of the present invention, a system for reducing noise in a MEMs-based system, includes a sensor array including at least two sensors, and a unit for ensemble averaging outputs of the sensor array.

With the unique and unobvious features of the present invention, the strength of MEMS technology can be leveraged where a desired silicon function is replicated "N" number of times with reduced incremental cost. While extra area and material for the MEMS substrate may be needed, in the case of a position sensor, N of them are replicated to measure the same position variable, and by means of ensemble averaging the effective sensor noise is reduced to ($\sigma/N^{0.5}$).

When the motion of an object is sensed using a common feature, for example an edge, the ensemble average gives the mean position of the edge (e.g., encompassed by the replicated sensor array) with or without any rotation of the edge.

By taking the difference between the sensor output at extremum locations, the rotation measure is extracted. In applications, for example, in a storage device where the read or seek process may tolerate more positioning error in contrast to a write, erase or servo formatting/writing process, the number of sensors powered-up for the purpose can be selected accordingly.

Finally, in systems where redundancy is required in case of single or multiple failure, a replicated sensor array provides an extra layer of protection. In worst case situation where only one sensor with excessive noise is available, the servo loop or filtering characteristics is modified accordingly to recover the user data in a lower performance mode.

When appropriate, the sensor range can be segmented, and multiple sensors progressively covering each segment are engaged to produce a single continuous output with superior noise properties. Segmentation produces improved signal-to-noise ratio as well as sensor bandwidth.

BRIEF DESCRIPTION OF THE DRAWINGS

The foregoing and other exemplary purposes, aspects and advantages will be better understood from the following detailed description of exemplary embodiments of the invention with reference to the drawings, in which.

DETAILED DESCRIPTION OF EXEMPLARY EMBODIMENTS OF THE INVENTION

Referring now to the drawings, and more particularly to FIGS. 5-12, there are shown exemplary embodiments of the method and structures according to the present invention.

Exemplary Embodiment

As mentioned above, the position accuracy of a servo control system can be improved conventionally by reducing the corner frequency "fc" of a low-pass filter (e.g., as shown in FIG. 2).

However, reducing the LPF corner frequency introduces additional phase lag and penalizes the dynamic performance, such as settling time, unfavorably. The present invention overcomes this limitation using, for example, ensemble averaging, as described below.

Theory of Ensemble Averaging:

The theory of ensemble averaging can be found in J. Bendat and A. Piersol, *Random Data Analysis and Measurement Procedures*, A Wiley-Interscience Publication, 1986, p. 10.

Briefly, assume a single sensor output voltage $$V_i(x,t) = a^* x(t) + n_i(t) \quad (1)$$

where "i" denotes a sensor with noise $n_i(t)$ which has a statistical mean of 0 and a standard deviation of $\sigma_I$. $x(t)$ is the mechanical position at time instant "t". "a" is the transducer gain assumed equal to all sensors.

If outputs of N sensors are added, then the total output voltage is given by:

$$V_T(x,t) = N^*(a^* x(t)) + \text{sum}(n_i(t)) \quad (2)$$

where the "summing" is carried over "N" sensors. It is well-known that when the noise of each sensor is independent of each other and if $\sigma_I = \sigma$, then the standard deviation (std) of the term "sum $(n_i(t))$" can be shown as (SQRT in the following equation means square root):

$$\text{Std}[\text{sum}(n_i(t))] = SQRT(N)^* \sigma \quad (3)$$

The instantaneous average of the total voltage can be shown to be:

$$V_{AVE}(x,t) = [V_T(x,t)]/N = (a^* x(t)) + \text{sum}(n_i(t))/N \quad (4)$$

Using the results of eq. (3), the standard deviation of the average voltage can be shown to be:

$$\text{Std}[V_{AVE}(x,t)] = \text{Std}[\text{sum}(n_i(t))/N)] = \text{Std}[\text{sum}(n_i(t))]/N = \sigma/SQRT(N) \quad (5)$$

In the above case, all sensors are treated as having equal importance and a uniform weighting of (1/N) is used.

The results can be generalized to include a non-uniformly-weighted ensemble average, rather than a simple average represented by eq. (4). In this case, each sensor output is weighted by a normalized gain factor $K_i$ (where sum $(K_i)=1$) before the voltage is added to form the weighted average. Equations (4) and (5) then become:

$$V_{W\text{-}AVE}(x,t) = \text{sum}[K_i^*(a^* x(t) + n_i(t))] \quad (6)$$

and $$\text{Std}[V_{W\text{-}AVE}(x,t)] = SQRT(\text{sum}[(Ki^* \sigma_I)^*(Ki^* \sigma_I)]) \quad (7)$$

If some sensors have distinctly different noise levels once the sensor gain "a" is matched, then the weighting term $K_i$ can be chosen as follows:

$$K_i = L_i/L_T \quad (8)$$

where $$L_i = 1/(\sigma_I)^2 \text{ and } L_T = \text{sum}(L_i) \quad (9)$$

Equations (8) and (9) help a logical criteria to allocate more weight to the sensor outputs known to contain less noise.

Turning now to further details of the present invention, first it is noted that for the invention to be optimally effective in the case of a position servo system is that the moveable target (e.g., an edge, an optical mark, a magnetic field, etc.) displaces by an identical amount along the axis of motion when multiple sensors are distributed over the target.

It is understood that the invention is applicable to any type of transduction process (e.g., pressure, temperature, acceleration etc.), with or without a servo, where an identical physical variable is applied to a replicated transducer array.

Further, it is noted that the present inventors have found that in a MEMs-based device, if one can use a number of relatively smaller sensors, then results may be better than if a single large sensor is used.

Figure 5:
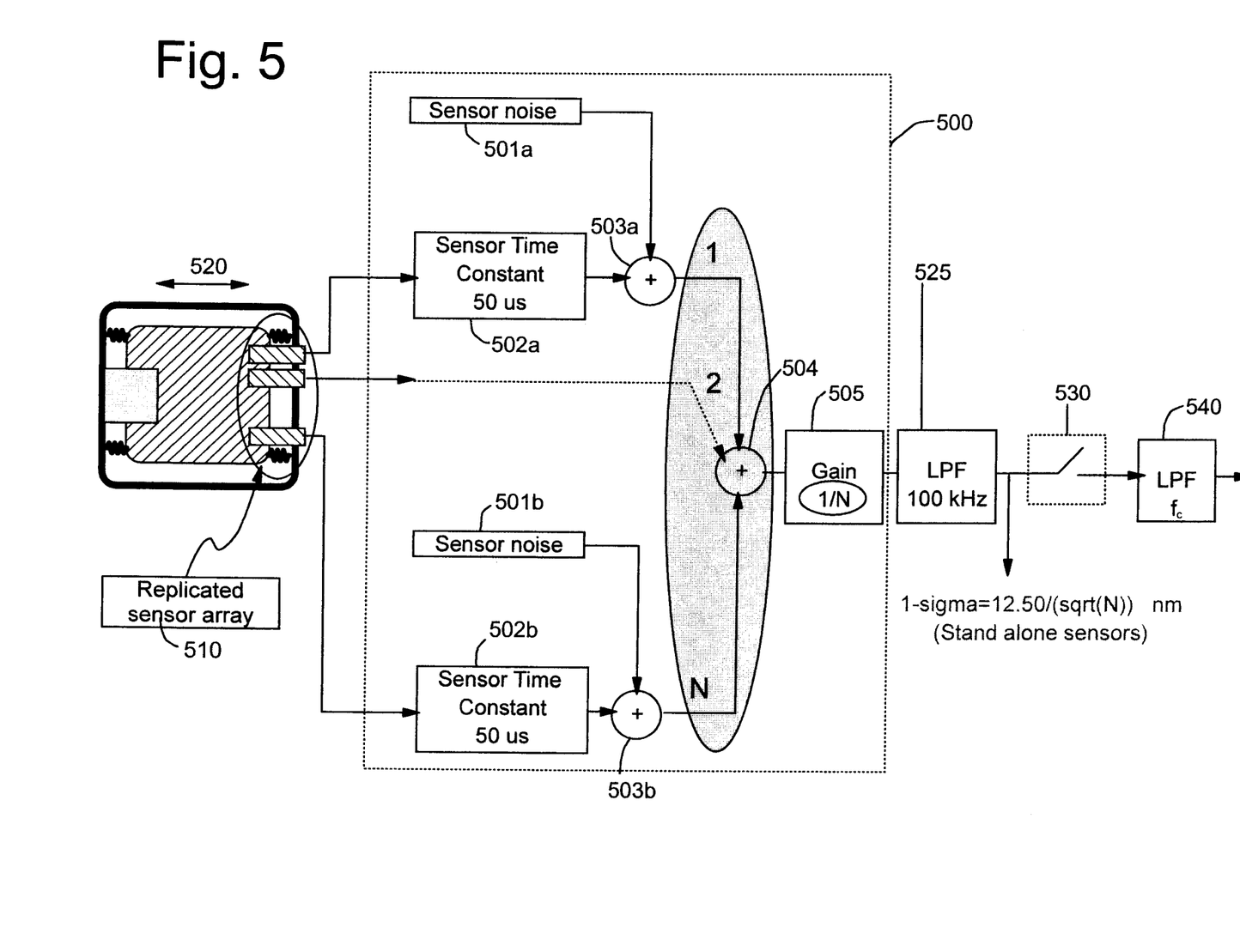
FIG. 5 illustrates a structure employing an ensemble averaging method with N-sensors.

FIG. 5 illustrates a system including the deployment of replicated position sensor array 510 in a MEMS device in which a uniformly weighted ensemble averaging according to eq. (4) is demonstrated.

That is, FIG. 5 shows an N-tuple sensor model 500 with ensemble averaging for enhanced servo precision. Reference numeral 520 shows the mechanical motion of the MEMs device. Within the model 500, as shown, sensor noise 501a, 501b, etc. are summed with the sensor time constraints 502a, 502b, etc. (e.g., 50 µs) by an intermediate summer 503a, 503b, etc.

Then, the output of the "N" identical (e.g., substantially identical or similar) sensors 510 are summed (e.g., by summer unit or summing junction 504), and a uniform weighting factor of (1/N) (e.g., via gain amplifier 505 or the like) is applied. The weighting factor of "1/N" can also be applied to each sensor output prior to the addition by summer 504. Thereafter, the output of the amplifier 505 is input to an LPF 520, the output of the LPF (100 kHz) 520 is sampled by the sampler 530 and input to the low pass filter 540. It is noted that as alluded to above the sensors need not be exactly identical for the superior results of the invention to be achieved.

If a single sensor of the replicated sensor array 510 has $\sigma = 12.5$ nm, then the ensemble average will have $12.5/(SQRT(N))$ as the standard deviation. The arithmetic operations shown in FIG. 5 can be achieved either in analog, digital or hybrid circuits with appropriate electronic elements and circuitry, and the automation of the ensemble averaging process is not elaborated in great detail.

Figure 6:
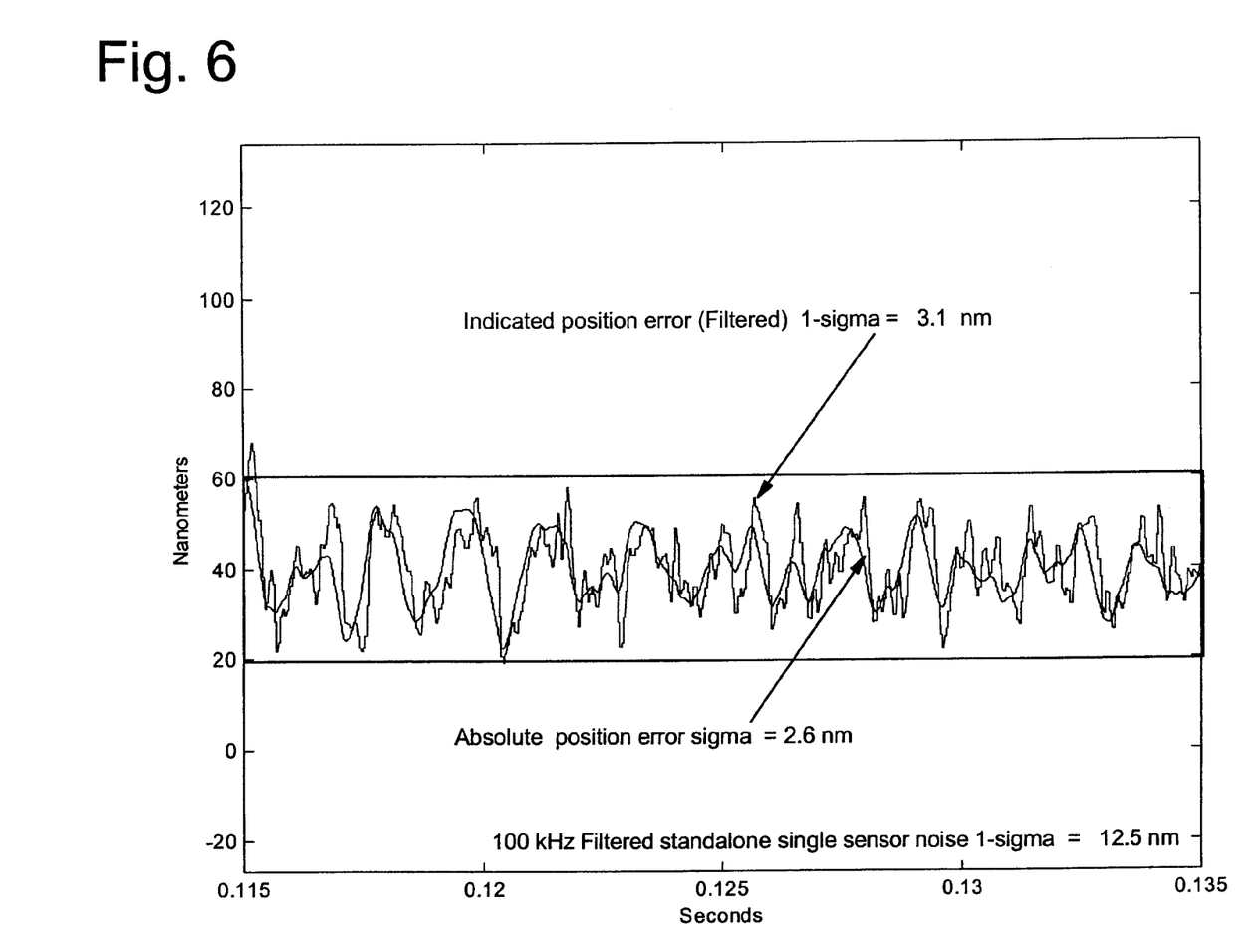
FIG. 6 illustrates servo position control performance with a two-sensor configuration.

FIG. 6 shows that an indicated position error of 3.1 nm and an absolute position error of 2.6 nm when 2 sensors are employed for ensemble averaging. Thus, FIG. 6 shows the servo position with the exemplary case of two position sensors, and a magnitude of improvement is clearly shown as compared, for example, to the plot of FIG. 4 (which shows the results of using a single sensor). It is noted that the theoretically projected values of $4.6/(2)^{0.5}=3.2$ and $3.6/(2)^{0.5}=2.6$, are very close to what is expected when the equivalent sensor noise is reduced by the ensemble averaging process according to the present invention.

Figure 7:
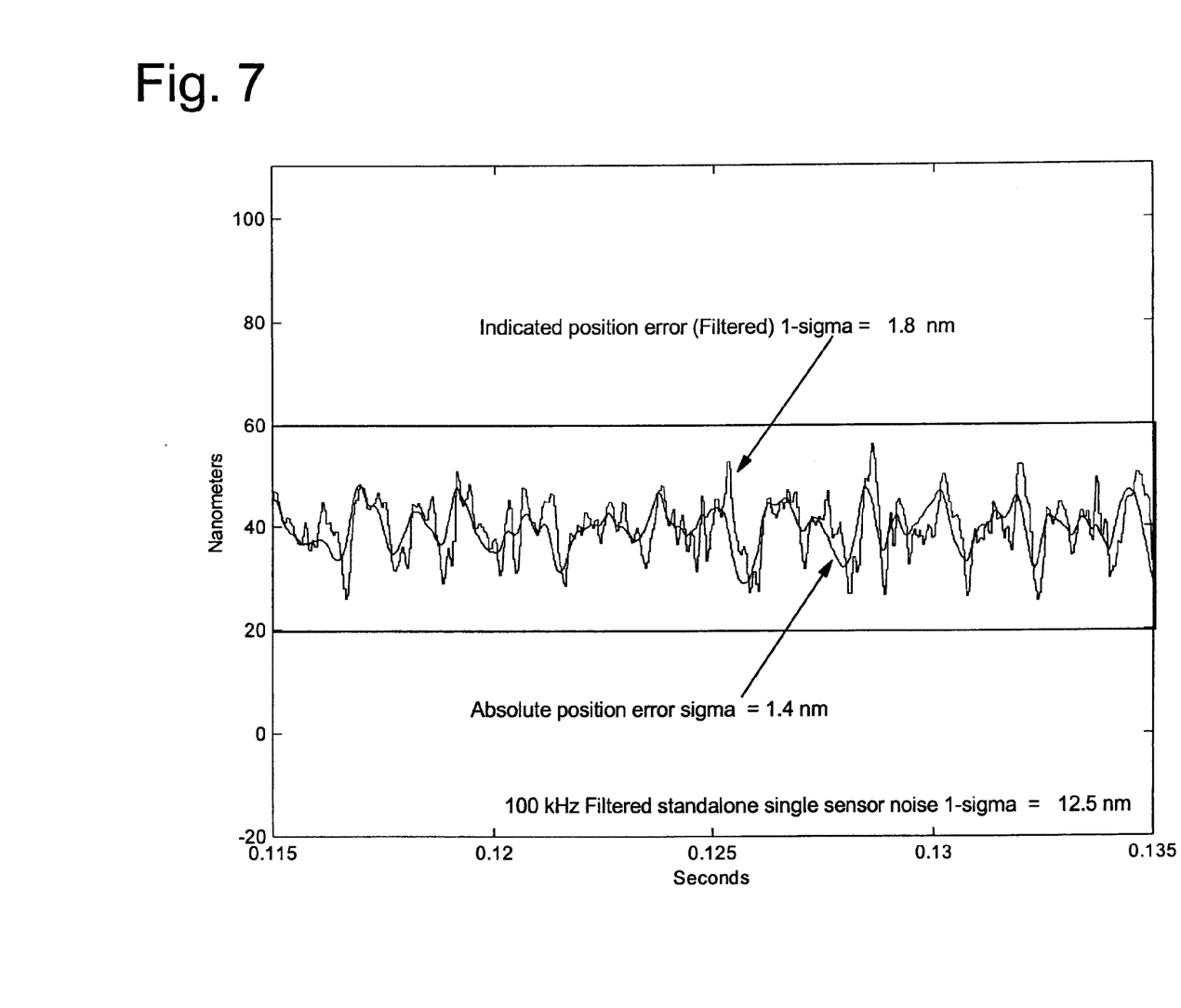
FIG. 7 illustrates servo position control performance with a four-sensor configuration.

FIG. 7 corresponds to a case with N=4 (e.g., servo performance with the exemplary case of using four position sensors). As shown, the two noise parameters are further reduced to 1.8 nm and 1.4 nm. Ideally, the sigma estimates should have been 4.6/2=2.3 nm and 3.6/2=1.8 nm. However, since the estimates are made from limited sample lengths, a margin of error can be expected.

Thus, as shown in FIG. 7, with four sensors, the noise becomes progressively better. Hence, if one can introduce four sensors, then one gains that much greater areal density capability, since the system can be positioned that much more precisely.

Figure 8:
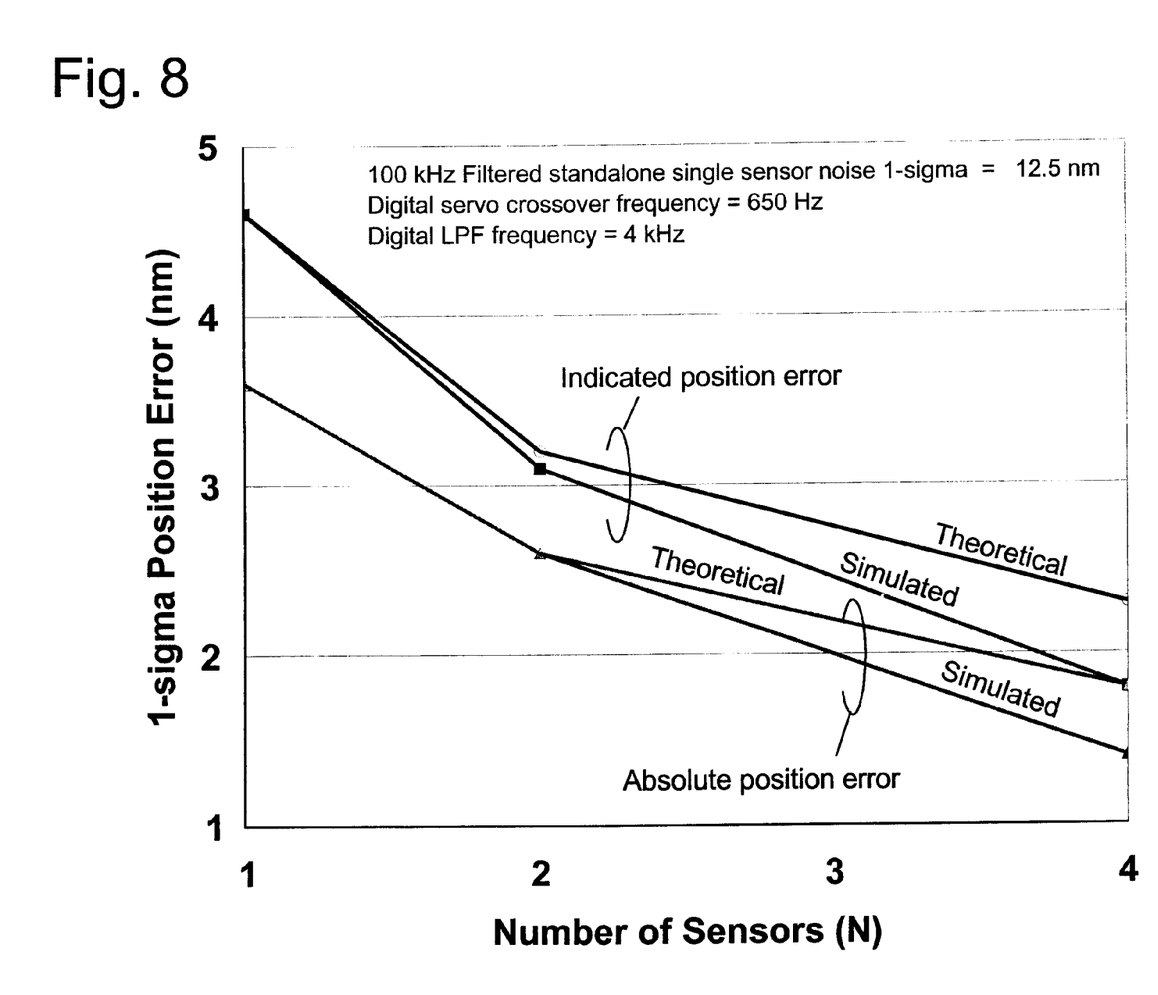
FIG. 8 illustrates estimated and projected position error 1-sigma values.

FIG. 8 summarizes the trend and shows the performance of the sensors, and shows a core aspect of the present invention.

That is, the larger the number of replicated sensors in a system, the higher is the potential to reduce the statistical positioning error without compromising the servo performance.

The advantages of the invention are evident from FIG. 8 in which a replicated sensor array is shown to improve positioning accuracy when ensemble averaging is employed. It is noted that there may be a difference between the actual position error one would obtain and the theoretical value of the position error (e.g., sigma over the square root of the number of sensors). Such difference may result from the simulated value being a time domain-based estimate. Thus, as shown in FIG. 8, there may be some difference/variation between the theoretical value and what one observes in the "real world" simulation.

In any event and as should be evident overall from FIG. 8, as more sensors are added the positioning error becomes smaller. The plot will have a hyperbolic shape and at some point will level off (e.g., however, it will never cross the zero line). Thus, with four sensors the noise will be decreased by a factor of 2, with nine sensors, the noise will be reduced by a factor of 3, with sixteen sensors, the noise will be reduced by a factor of 4, etc.

Figure 9:
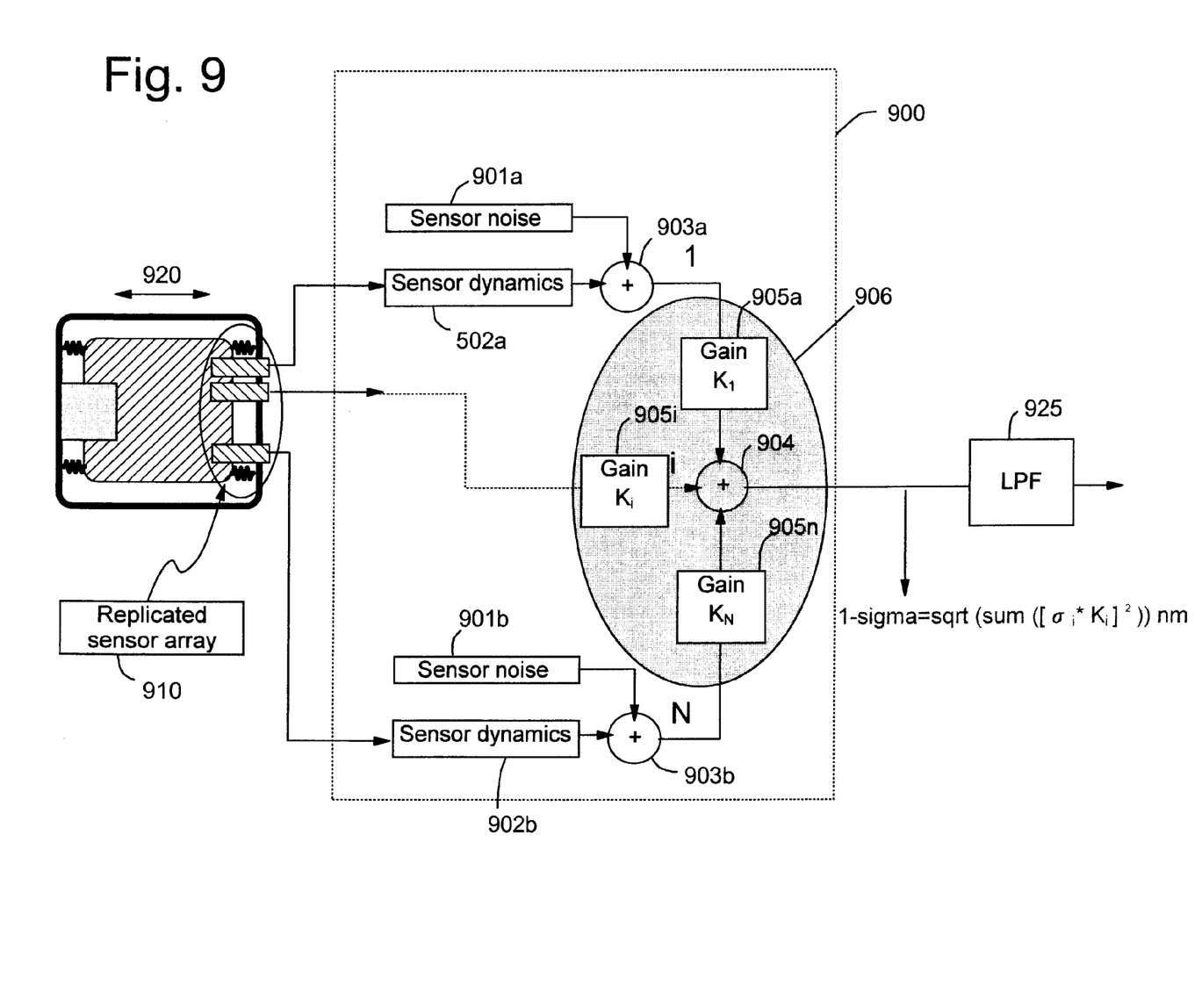
FIG. 9 illustrates a structure employing a non-uniformly weighted ensemble averaging method with N-sensors, according to the present invention.

FIG. 9 extends the implementation of uniformly-weighted ensemble averaging method by an extra step. That is FIG. 9 shows an N-tuple sensor model with weighted ensemble averaging for enhanced servo precision.

Specifically, in applications where each sensor has similar gain characteristics, the noise level may vary depending on the MEMS construction detail. Under this condition, the sensor output can be weighted according to its reliability, for example, in proportion to its signal-to-noise ratio (SNR). Relationships derived in eqs. (6), (7), (8) and (9) correspond to noise power-based weighting function. Hence, in FIG. 9, instead of giving equal weight to all the sensor noise, the invention recognizes that some sensors behave differently than others, and thus a gain term can be introduced depending upon the sensor behavior. Hence, the sensors can be fine-tuned by using different gains depending upon their sensor performance and noise level.

Hence, in FIG. 9, one can imagine that with $r_i$ (the sensor noise), instead of adding a proportional number of $r_i$, then one can provide more weight to a "good" (in terms of performance) sensor and provide less weight to a "poor" sensor. Thus, optimal ratio combining can be used as discussed below.

The method of combining the sensor outputs is referred to as "Optimal Ratio Combiner (ORC)." In applications where the transducer gain "a" is subject to variation, a calibration process is conducted to determine the required "correction" gain for each sensor prior to the computation of the ensemble average. Hence, if the sensors have different gains, then it is possible to fine-tune the average computation process.

It is understood that the calibration and gain matching operations are easily accomplished using elements of a digital computer and appropriate algorithms.

Additionally, it is noted that calibration can be performed based on dimensional parameters and current, one could estimate the expected gains. Hence, before shipping the sensor, one could perform a fine calibration on the manufacturing line, for example. As another example, one could have a high precision sensor which may draw a lot of power and be undesirable for local use, but which could be used as a calibrator before the system is left to work on its own.

Returning to FIG. 9, there is shown a system including a replicated position sensor array 910 in a MEMS device in which weighted ensemble averaging is performed. That is, FIG. 9 shows an N-tuple sensor model 900 with weighted ensemble averaging for enhanced servo precision. Reference numeral 920 shows the mechanical motion of the MEMs device. Within the model 900, as shown, sensor noise 901$a$, 901$b$, etc. are summed with the sensor dynamics (behavior) 902$a$, 902$b$, etc. by an intermediate summer 903$a$, 903$b$, etc.

Then, the output of the intermediate summers 903$a$, 903$b$, etc. are input to a respective gain unit 905$a$, 905$i$, 905$n$, etc. and then the outputs of the gain units 905$a$, 905,$i$, 905$n$, etc. are input to a summer 904. Summer 904 provides an output to LPF 920.

It is noted that a disadvantage of replicating the sensor is that the power consumption is increased proportional to "N".

However, a tradeoff can be considered depending on the mode of use of the servo system. In the case of a storage application, the read process is more tolerant to positioning error than the write or erase process. Therefore, the number of sensors needed for a read servo operation can be reduced, thereby saving power.

Figure 10:
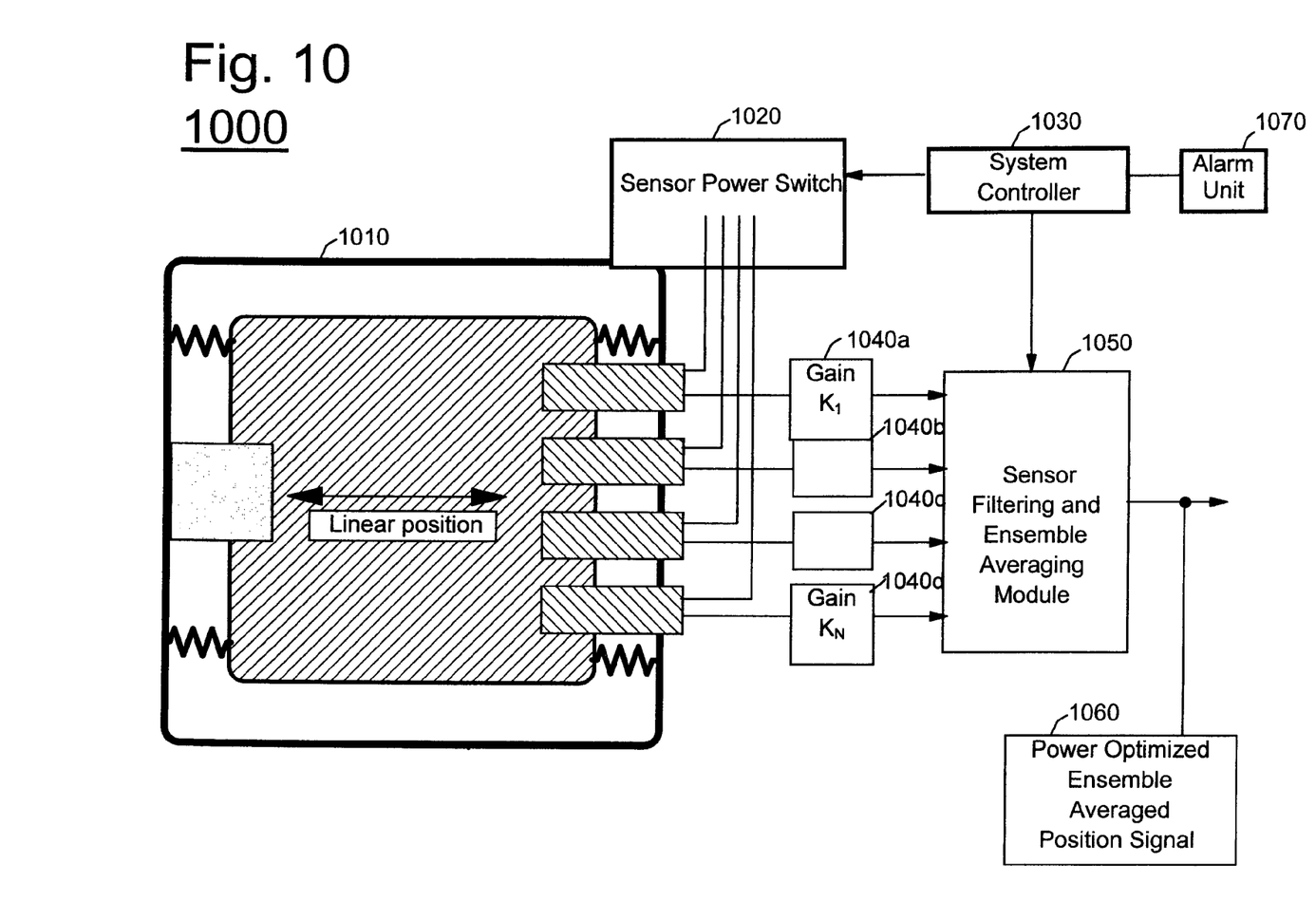
FIG. 10 illustrates a structure 1000 including elements to achieve a tradeoff between effective noise and total sensor power according to the present invention.

FIG. 10 shows a schematic of elements involved in an exemplary system 1000 including a MEMs positioning system 1010, sensor power switch 1020, system controller 1030 and a sensor filtering and ensemble averaging module 1050.

System 1000 can utilize optimal ratio combining (e.g., using gain additionally) in which gain (e.g., gain units 1040$a$-1040$d$) can be used to adjust (penalize) accordingly sensors with greater or lesser noise. Thus, gain can be used.

Further, the sensors can be selectively powered down to save power, since not all of the sensors need to be energized (or at least energized completely).

In FIG. 10, the system controller 1030 which has the knowledge of the read/write process can choose (via a signal to the sensor power switch 1020) the best group of sensors (e.g., the two extreme sensors and an intermediate sensor) needed for a read operation, and power-down the remaining sensors that are not needed for the operation. (Generally, relatively more sensors are needed for write/erase operations as opposed to those needed for a read operation).

The corresponding information is concurrently transmitted to the filtering and ensemble averaging module 1050 to account for the change in number of sensors.

Alternatively, the replicated sensor array provides built-in redundancy to the system. That is, in the case of an inadvertent failure of a sensor, another sensor can be activated that would have been powered-down otherwise. Module 1050 issues a power optimized ensemble averaged position signal 1060. Thus, in the system of FIG. 10, the gain and/or the sensors can be selectively adjusted/activated.

In a worst-case scenario, in a storage application where all sensors except one have failed, a user alert is delivered through an appropriate communication protocol (e.g., visual and/or audio alarm unit 1070), and the MEMS system is prepared to backup the data in the memory (not shown in FIG. 10). In order to achieve precision needed for a read process, a low-pass filter may be included in the servo loop and a corner frequency of the LPF may be reduced drastically to meet the noise requirement while compromising the performance, such as access or settling characteristics.

There are special configurations where the linear motion of a MEMS positioner becomes distorted by angular rotation. Due to manufacturing asymmetry, for example, the linkages that help guide the motion may not be etched as anticipated, and may induce a rotation component. In certain cases, the members forming the MEMS structure may expand unevenly due to non-uniform thermal distribution of the silicon. Under this condition, it may be necessary to infer the rotation of the movable platform. The sensors at the extreme position can render the rotation information, as shown in FIG. 11.

Figure 11:
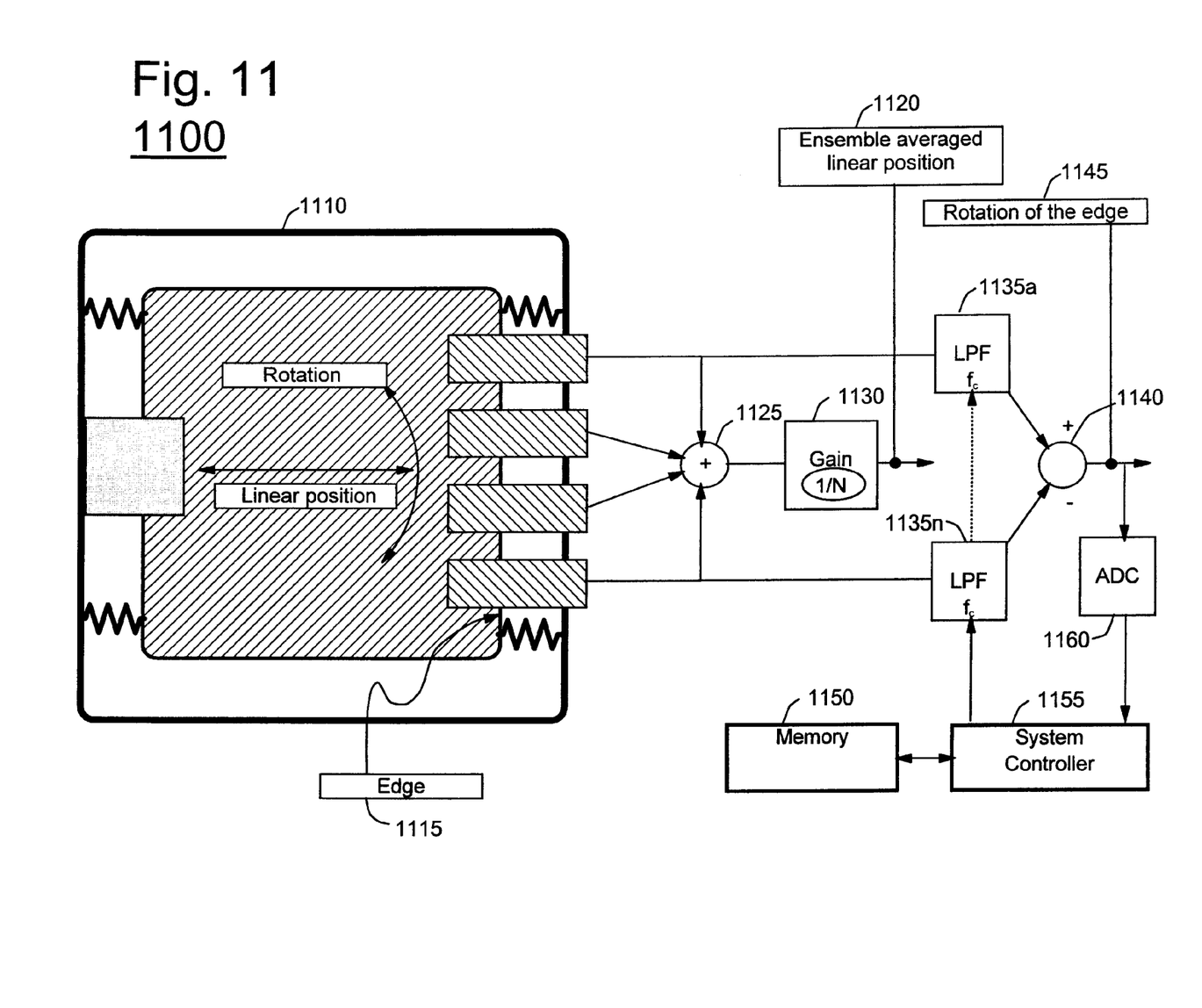
FIG. 11 illustrates a structure 1100 including simultaneous rotation measurement with linear ensemble averaged servo.

More specifically, FIG. 11 illustrates a system 1100 including a MEMS device 1110 (having an edge 1115) in which ensemble averaging is performed. In FIG. 11, sensor outputs are provided to a summer 1125, and the sensor outputs by the two extreme sensors are also provided directly to low pass filter 1135$a$ and 1135$n$.

Summer 1125 provides a summed input signal to a gain unit 1130 which outputs an ensemble averaged linear position signal 1120. The lowpass filters 1135a and 1135n provide an input to a summer 1140.

Then, the output of summer 1140, which is a signal representing a rotation of the edge 1115, is provided to an analog-to-digital converter (ADC) 1160. The ADC 1160 outputs a signal to the system controller 1155 which can access a memory 1150. System controller 1155 can also issue a signal to set the characteristics (e.g., set the corner frequencies, etc.) of the low pass filter(s). Thus, the low pass filter(s) can be desirably programmed. For example, if high frequency rotation information is not needed, then the characteristics of the low pass filter(s) can be suitably programmed. An A/D converter also can be provided for the output of the gain unit 1130.

Thus, in FIG. 11, the same sensors, while contributing to the ensemble averaging process, can also contribute to rotation measurement. The rotation measurement noise level can be reduced by additional filtering since this branch of the measurement is not part of a servo loop where phase lag matters.

The sensor noise level and bandwidth may have a strong dependency on the total active range of a transducer. For example, a larger thermally-sensitive material will have a larger time constant and is liable to generate more thermal noise. The concept of replication can be used to make multiple sub-sensing elements with an overlapping region as shown in FIG. 12.

Figure 12:
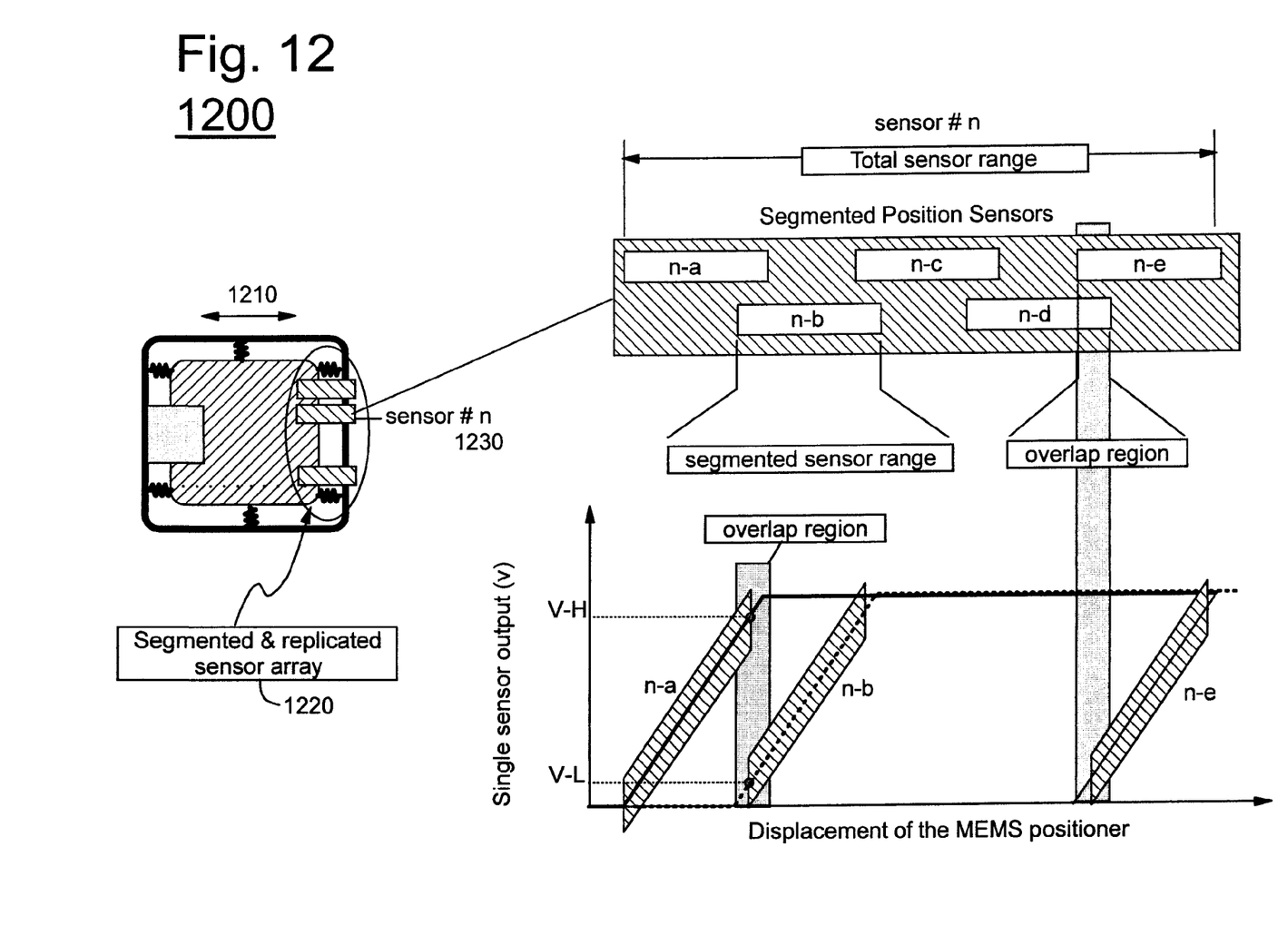
FIG. 12 illustrates a structure 1200 including segmented sensors 1230 for improved noise reduction.

Thus, FIG. 12 shows the dilemma of wanting the sensors to have a good long-range detection capability and yet at the same time a good signal-to-noise ratio. However, in a situation where there is a single sensor suffering from a problem of range versus noise, the present invention aims to overcome this problem as mentioned above.

More specifically, FIG. 12 illustrates system 1200 including a MEMs device having a mechanical motion 1210 and a segmented and replicated sensor array 1220 including a plurality of sensors 1230.

For example, a sensor denoted by #n is actually segmented into a plurality (e.g., 5) shorter ranges n-a, n-b . . . n-e. Each sensor segment now has shorter range with correspondingly improved noise and bandwidth.

The high output of a segment (e.g., say segment n-a denoted by V-H(n-a)) is electronically switched (i.e., composed) to the low output of the next segment (V-L(n-b)), thereby providing a longer range with improved noise and bandwidth characteristics. The complexity of composing the sensor output can be somewhat simplified by augmenting the segmented sensors with a single, large-range sensor so that during a high velocity move, the coarse position and fine position information are readily made available.

Thus, the system 1200 can cut down the range of detection of each sensor into a plurality of portions/stages (e.g., na-ne shown in FIG. 12), thereby to minimize the noise. Hence, a shorter detection range portion of a sensor of interest can be selectively employed and switched.

Thus, with the unique and unobvious aspects of the present invention, ensemble averaging can be performed with (or without) a servo loop with a positioning system with an incoming phase loss, the invention can decrease the noise level. This is in complete contrast to a conventional low pass filter which can cut down only the high frequency noise, but it does not affect the low frequency noise. In contrast, when the ensemble averaging is performed according to the present invention, noise is reduced across the entire bandwidth.

Hence, the present invention can be applied to a MEMs device to improve positioning capability, without incurring a phase loss.

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

This signal-bearing media may include, for example, a RAM contained within a CPU, as represented by the fast-access storage for example. Alternatively, the instructions may be contained in another signal-bearing media, such as a memory 1150, or a magnetic data storage or CD-ROM diskette, directly or indirectly accessible by the CPU.

Whether contained in the memory, CD-ROM, diskette, the computer/CPU, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A MEMs-based system, comprising:
   a sensor array including at least two sensors providing an basis output for ensemble averaging; and
   a calibrator that calibrates said sensors to determine a required correction gain for each sensor prior to computation of the ensemble average.

2. The system of claim 1, wherein said at least two sensors comprise at least two replicated sensors.

3. The system of claim 1, further comprising:
   an optimal ratio combiner that extends the ensemble averaging when the sensor array includes non-uniform noise statistics.

4. The system of claim 1, further comprising:
   a system controller for controlling a power of the sensor array such that the power is selectively adjusted to achieve a desired precision while simultaneously minimizing power consumption by the sensor array.

5. The system of claim 4, wherein the system controller controls said power by limiting a number of sensors activated for servo control.

6. The system of claim 1, further comprising:
   means for detecting a sensor failure and for providing a redundancy against failure.

7. The system of claim 1, wherein at least one sensor of said at least two sensors is segmentable to selectively adjust a signal-to-noise ratio in relation to a desired range and complexity.

8. The system of claim 1, further comprising:
an alarm unit that notifies a user of a failure of a predetermined number of said at least two sensors.

9. The system of claim 8, further comprising:
a low-pass filter coupled to receive an output of said ensemble averaging; and
a servo loop coupled to said low-pass filter,
wherein when said user is notified about a last remaining functioning sensor by said alarm unit, the servo loop allows for data backup with an increased level of filtering by said low-pass filter.

10. The system of claim 1, wherein said at least two sensors operate based on a transduction process comprising any of a pressure, temperature, and acceleration.

11. The system of claim 1, wherein said ensemble averaging is performed with servo control.

12. The system of claim 1, wherein said ensemble averaging is performed devoid of servo control.

13. The system of claim 1, wherein said at least two sensors are substantially identical.

14. The system of claim 13, further comprising:
a summer that sums outputs of the substantially identical sensors; and
a gain amplifier that applies a uniform weighting factor to one of an output of the summer and the outputs of the substantially identical sensors.

15. The system of claim 1, further comprising:
a low-pass filter that receives an output of the an amplifier;
a sampler that samples the output of the low pass filter; and
a second low pass filter that receives the output of the sampler.

16. The system of claim 1, wherein the ensemble averaging comprises a weighted ensemble averaging such that the output of each of said at least two sensors is weighted according to its signal-to-noise ratio (SNR).

17. The system of claim 1, wherein said ensemble averaging comprises a uniformly-weighted ensemble averaging such that equal weight is given to all outputs of said at least two sensors.

18. The system of claim 16, further comprising:
a gain unit that adjusts an output of a sensor of said at least two sensors depending upon a behavior of said sensor.

19. The system of claim 1, further comprising:
a gain unit that, depending upon a behavior of said at least two sensors, adjusts any of the outputs of said at least two sensors by using different gains depending upon a performance and a noise level of said any of said at least two sensors.

20. The system of claim 1, further comprising:
an optimal ratio combiner that combines the sensor outputs.

21. The system of claim 1, further comprising:
a system controller that selectively controls an activation and deactivation of a sensor of said at least two sensors.

22. The system of claim 21, wherein the system controller controls said at least two sensors to select a best sensor or a best group of sensors for a predetermined operation, and powers-down remaining sensors that are not needed for the predetermined operation.

23. The system of claim 22, further comprising:
a filtering and ensemble averaging module,
wherein information regarding the sensors selected by said system controller, is concurrently transmitted from said system controller to the filtering and ensemble averaging module to account for a change in number of sensors.

24. The system of claim 22, wherein in a case of inadvertent failure of an activated sensor, said system controller activates a second sensor which is powered-down.

25. The system of claim 22, wherein first and second sensors of said at least two sensors are located at two extreme positions of said MEMs device, and provide rotation information of a component of said MEMs device.

26. The system of claim 25, further comprising:
first and second low pass filters for receiving outputs from the first and second sensors, said first and second low-pass filters providing an input to a summer, said summer receiving a gain signal having been applied to sensor outputs other than those from the first and second sensors and an ensemble averaged linear position signal,
wherein the output of summer is combined with a signal representing a rotation of an edge of said component of said MEMs device, said component comprising a movable platform.

27. The system of claim 22, wherein same sensors of said at least two sensors contributing to the ensemble averaging also contribute to rotation measurement of a component of said MEMs device.

28. The system of claim 1, wherein a sensor of said at least two sensors includes multiple sub-sensing elements with an overlapping region.

29. The system of claim 1, wherein said at least two sensors comprise a segmented and replicated sensor array.

30. The system of claim 1, wherein the ensemble averaging reduces noise across an entire bandwidth of said at least two sensors.

31. The system of claim 1, further comprising:
a system controller controlling said at least two sensors; and
an alarm unit that notifies any of said system controller and a user that a predetermined number of sensors of said at least two sensors have failed, and initiates a backup of data collected by said at least two sensors.

32. A computer-readable medium tangibly embodying a program of machine-readable instructions executable by a digital processing apparatus to perform a method of reducing noise in a MEMs-based system, comprising:
providing a sensor array including at least two sensors; and
ensemble averaging outputs of said sensor array; and
calibrating said sensors to determine a required correction gain for each sensor prior to computation of the ensemble average.

33. A system for reducing noise in a MEMs-based system, comprising:
a sensor array including at least two sensors; and
means for ensemble averaging outputs of said sensor array; and
means for calibrating said sensors to determine a required correction gain for each sensor prior to computation of the ensemble average.

* * * * *